J. Bayliss,
Tuyere,
Nº 68,939. Patented Sep. 17, 1867.
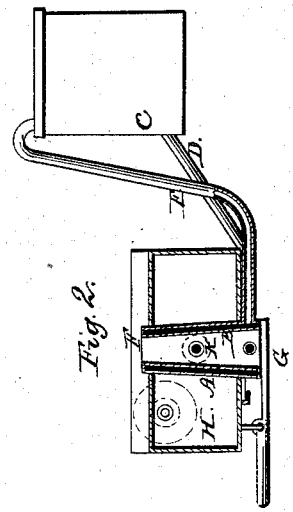
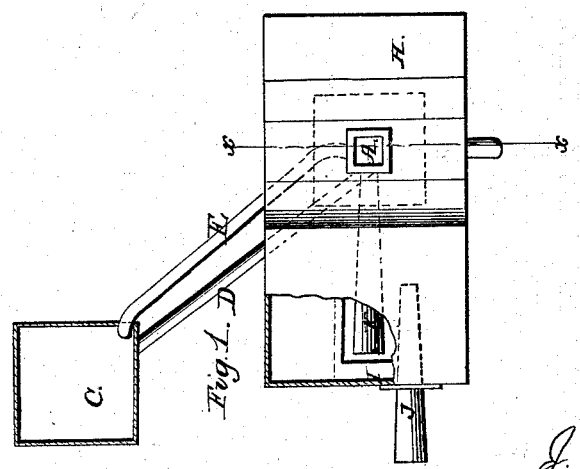

United States Patent Office.

JOHN BAYLISS, OF NEW YORK, N. Y.

Letters Patent No. 68,939, dated September 17, 1867.

IMPROVED TUYERE FOR FURNACES.

The Schedule referred to in these Letters Patent and making part of the same.

TO ALL WHOM IT MAY CONCERN:

Be it known that I, JOHN BAYLISS, of the city, county, and State of New York, have invented a new and useful Improvement in Tuyeres for Blast-Furnaces; and I do hereby declare that the following is a full, clear, and exact description thereof, which will enable others skilled in the art to make and use the same.

The present invention relates more particularly to an improvement in a tuyere for blast-furnaces, embraced in Letters Patent granted to me on the seventh day of August, A. D. 1866; and it consists in a novel arrangement and combination of the air-chamber with regard to the tuyere, through which the air passes before entering the mouth of the tuyere. In the accompanying plate of drawings my improvement in tuyeres is illustrated—

Figure 1 being a plan or top view of the same, broken out at one part to more fully show it; and Figure 2 is a transverse vertical section taken in the plane of the line $x\,x$, fig. 1.

A, in the drawings, represents the tuyere, which may be of any of the ordinary constructions therefor, but which in the present instance has its rear portion B made hollow to allow a circulation of water or other cooling medium through the same from a reservoir, C, suitably connected therewith through pipes D and E; the one, D, for the passage of the water, and the other, E, for the escape of the steam generated by the heat of the tuyere from the water. The tuyere A is placed in a vertical position, with its mouth or orifice F on a level, or nearly so, with the fire-grate of the furnace; the lower end of the said orifice being closed by a cover-plate or cap, G, hung so as to be swung away from the same, but so weighted as to be held firmly and tightly closed. Surrounding the tuyere A is a box or casing, H, that at one end I is connected through a pipe, J, to the apparatus used for producing the air-blast; the air which enters the said box H through the pipe J, passing from the same into the mouth of the tuyere through a pipe, K, upon the inside of the box into which it opens at one end, and at its other inserted and fastened in the tuyere at one side of the same, as shown in the drawings.

From the above description it is plain to be seen that the air-blast in passing to the tuyere through the air-chamber, or box H surrounding it, must necessarily become heated thereby, and form the heat of the furnace, itself acting through the top plate I of the box, whereby the consumption of the products of combustion in the furnace is greatly increased and a consequent greater amount of heat generated than by the ordinary mode of passing the air-blast directly through the tuyere—a quite important advantage and desideratum.

Having thus described my invention, I claim as new, and desire to secure by Letters Patent—

The chambered tuyere A, in combination with a water-reservoir, an air-chamber, and suitable water and blast pipes, all constructed and arranged substantially as described.

JOHN BAYLISS.

Witnesses:
WM. F. MCNAMARA,
ALBERT W. BROWN.